Patented Oct. 15, 1940

2,218,167

UNITED STATES PATENT OFFICE 2,218,167

RUBBER COMPOSITION

Henry H. Harkins, North Providence, R. I., assignor to United States Rubber Company, New York, N. Y., a corporation of New Jersey No Drawing. Application April 11, 1939,
Serial No. 267,319

12 Claims. (Cl. 260—4)

This invention relates to the production of new rubber products and more particularly a new and improved type of flexible hard-rubber, and to articles made at least in part of or coated with such compositions.

This application is a continuation-in-part of my copending application Serial No. 86,988, filed June 24, 1936.

Ordinary hard rubber, or ebonite, which is derived from the use of natural caoutchouc or Hevea rubber, is widely used for the manufacture of molded articles and of protective linings, or coatings on articles, particularly metal articles, which in use are subjected to the action of corrosive chemicals. The inertness of ebonite toward caustic alkalies, non-oxidizing acids and many organic liquids makes it eminently suitable for many such purposes. However, ebonite has certain physical properties which have greatly limited its usefulness, including its lack of flexibility, its low impact resistance, its high coefficient of linear expansion, and its great increase in hardness and brittleness when subjected to very low temperatures such as those in the range from 0° to —40° C. and below. As a consequence of these properties it has been commercially impractical to apply hard rubber linings directly on metal articles such as tanks, pipes, valves, tank cars, barrels, etc., which in use are to be subjected to widely fluctuating temperature conditions. Under such conditions a hard rubber lining is practically certain to crack, thus exposing the underlying metal directly to corrosion.

Various attempts have been made to provide a hard rubber having greater flexibility and hence less liability toward cracking. For example, the use of so-called semi-hard rubber compositions has been suggested, but these are subject to the limitations that they become increasingly harder and more brittle upon continual exposure to higher temperatures such as from 80° to 120° C., they are less resistant to corrosive chemicals than is hard rubber, and they also lose their flexibility and become more hard and brittle at temperatures below 0° C.

It has also been proposed to admix with hard rubber compositions a plastic elastic and non-vulcanizable material obtainable by the reaction of ethylene chloride upon benzene and certain homologs thereof in the presence of aluminum chloride. Vulcanized hard rubber containing a high proportion of such benzene plactic is more flexible than hard rubber not containing such plastic, at ordinary temperatures, but the plastic itself hardens, or "freezes," at about 0° C. and flexible hard rubber containing it accordingly becomes hard and brittle at temperatures below 0° C.

Hard rubber has likewise been prepared having an admixture of rubber with rubber-like polymers of 2-chloro-1,3-butadiene. Such hard rubber compositions remain relatively flexible both at ordinary and at low temperatures, but become hard and brittle upon long exposure to higher temperatures and are thereafter hard and liable to crack at low temperatures. Such compositions are also very difficult to handle in the unvulcanized state because they are subject to premature "setting up" or loss of plasticity due to the polymerizing effect of the large amount of sulfur present upon the chlorobutadiene polymer.

Such materials as oils, waxes, and petroleum jelly have also been added to make hard rubber more flexible, but such materials either sweat out of the rubber at higher temperatures or solidify and render the rubber hard and brittle at low temperatures, and they also make it difficult to bond the hard rubber to other materials such as metal.

Thus it appears that the art has failed to discover a satisfactory method whereby ebonite may be rendered permanently flexible and shock-resistant so as to withstand extremes of both high and low temperatures.

An object of this invention is to use the same type of rubber that is used in making ordinary hard rubber or ebonite and to provide a hard rubber composition which is suitable for making molded articles and for lining or covering metal articles and the like, and which will remain flexible and shock-resistant over a wide range of temperature conditions. A further object is to provide a chemically resistant lining material for tanks, pipes, barrels, tank cars and the like which will not crack upon exposure to very low temperatures, even when adhered directly to a metal surface. Other objects will be apparent from the invention herein described.

According to the invention, a flexible hard rubber is produced from a composition comprising rubber and a normally elastic relatively non-plastic high-molecular weight polymer of a purely aliphatic mono-olefine having a branched carbon chain. The compositions may be prepared by milling together the rubber and the mono-olefine polymer with the addition of any other desired ingredients such as fillers, accelerators and the like including as vulcanizing agent for the rubber an amount of sulphur sufficient for conversion of the rubber to hard rubber upon vulcanization. The amount of sulphur incorporated or present to function as the vulcanizing agent should be equal to at least 30% of the weight of the rubber, so as to confer on the rubber after cure a vulcanization coefficient of from 30 to 47. The unvulcanized composition may be molded, calendered, extruded or otherwise shaped in any desired manner and then vulcanized in any suitable manner.

The mono-olefine polymers of a molecular weight of from 500 up to at least 280,000 (measured by Staudinger's viscosity method) are known,—and may be prepared in a manner known to the art, one such method being indicated in U. S. 2,138,895, as applied to polymerization of a preferred mono-olefine, e. g. isobutylene, with boron trifloride. Some of these materials are known to the trade under the name "Vistanex." The molecular weight range 500 to 280,000 and higher includes a series of from fluid to plastic and relatively non-elastic polymers in the lower part of the range, as well as a series of distinctive normally elastic polymers in the upper part of the range having a molecular weight of from 50,000 and upwards. Experience has shown that the so-called plastic polymers give poor ebonite, cracking or breaking easily particularly when bent sharply; the distinctive elastic polymers on the contrary give good flexible ebonite products. For the purposes of this invention, therefore, the mono-olefine polymers to be employed are those having a molecular weight on the same order as that of natural crude rubber, i. e., those polymers having a molecular weight of at least 50,000 to 150,000 and upwards, for example, a molecular weight of about 70,000. These higher polymers are similar to rubber in being highly elastic, and they are also characterized as being water-white, substantially non-tacky and odorless solid masses soluble in aliphatic hydrocarbons such as gasoline and petroleum oils, and insoluble in acetone or alcohol. They are further characterized herein as being essentially saturated hydrocarbons, that is, having a very low degree of chemical unsaturation, and as substantially inert to the action of corrosive chemicals including ozone.

Unlike the lower polymers such as those having molecular weights of from 1000 to 12,000, which are sticky semi-liquids, or normally plastic relatively non-elastic polymers, the higher elastic polymers herein employed are millable, like rubber, and miscible therewith in all proportions, but unlike rubber, they exhibit a very high elastic recovery even after long milling and are not "broken down" or rendered permanently more plastic by either heat or milling. This property of high elastic recovery renders the polymers unsuitable per se for extrusion but when blended with rubber as aforesaid, the composition may be readily calendered or extruded without excessive shrinkage.

An example of such an elastic polyisobutylene product which is known to the trade under the name of Vistanex, and which is particularly useful to the present purposes, is characterized as being water-white, substantially odorless, soluble in aliphatic hydrocarbons such as gasoline and petroleum oils, and insoluble in alcohol and acetone. It has a very low degree of chemical unsaturation, is substantially inert to the action of air, concentrated sulfuric acid, concentrated nitric acid, and strong alkalies at room temperatures. It is stable toward ultra-violet light and oxygen at temperatures up to at least 100° C. It is a rubbery material which is believed to have an average molecular weight of about 70,000, and it has a tensile strength of about 500 to 600 pounds per square inch and an ultimate elongation of 800 to 1400% and upon release will revert to approximately its original length. The olefin polymer may be milled, and although it does not thereby "break down" or become permanently more plastic as does rubber, it appears to be miscible with rubber in all proportions. It has very good resistance to heat and a high elasticity over a wide range of temperatures.

The following example is given to illustrate a preferred mode of practicing the invention:

Smoked sheets_____ 100
Isobutylene polymer_____ 100
  (molecular weight 70,000)
Sulfur _____ 50
Accelerator_____ 2
Filler _____ 15

The isobutylene polymer and the rubber are blended thoroughly on the mill, after which the other ingredients are added.

This mixture can be vulcanized in steam or in a press; after vulcanization the composition remains distinctly flexible and retains this flexibility throughout a wide temperature range, including temperatures as low as —40° F.

The polymerized elastic mono-olefine hard rubber combination is substantially heatproof, that is, after vulcanization it does not harden any further on continued exposure to fairly high temperatures, even in an oxidizing atmosphere; further, articles and linings prepared therefrom remain flexible at temperatures as low as —30° F., and undergo very little change in other physical properties at such low temperatures, being in this respect very different from semi-hard rubber and other modified hard-rubber compositions having a similar flexibility and hardness at ordinary room temperatures only. Linings prepared from the compositions of the invention are accordingly very resistant both to fracture due to exposure to low temperatures, and to fracture from impact and moderate bending even at low temperatures.

For lining purposes, the combination may be adhered directly to the metal or may be superposed on an intermediate cushioning layer of a different type of rubber composition such as soft rubber or semi-hard rubber, and then covered or not with a soft rubber composition. Any suitable type of rubber-to-metal adhesive may be used for applying it to the tank and the like. It is to be understood of course that the composition of the invention is to be applied to the tank wall before curing the same, as in the usual tank lining practice and that the manner of application and curing may be that as practiced with soft or hard rubber compositions as will be understood by those skilled in the art.

The proportion of the elastic mono-olefine polymer incorporated in the hard rubber compositions may be varied to suit the particular conditions under which the composition is to be used; for example, where a tank lining must be fracture-proof under the most severe low temperature conditions, the composition should contain from 100 to 150 parts by weight of the elastic mono-olefine polymer per 100 parts by weight of rubber; for less severe temperature conditions, lower proportions of the elastic mono-olefine polymer may be used. In general, for the best results, it is desirable to use at least about 40 parts of the elastic mono-olefine polymer per 100 parts of rubber.

The term "rubber" herein is applied to mean ordinary rubber, i. e. natural crude caoutchouc.

Having thus described my invention, what I claim and desire to protect by Letters Patent is:

1. A composition comprising a vulcanized mixture of 100 parts by weight of rubber and sulphur in an amount sufficient to convert the rubber on cure to hard rubber having a vulcanization coefficient of at least about 30, blended with at least 40 parts by weight of an elastic high molecular weight polymer of a purely aliphatic mono-olefine having a branch carbon chain, said polymer being of sufficiently high molecular weight to exhibit the property of substantially complete elastic recovery.

2. A flexible hard rubber material which is the vulcanization product of a composition comprising a blend of about 100 parts by weight of rubber and sulphur in an amount sufficient to convert the rubber on cure to hard rubber, with at least about 40 parts by weight of an elastic high molecular weight polymer of a purely aliphatic mono-olefine having a branched carbon chain, said polymer being of sufficiently high molecular weight to exhibit the property of substantially complete elastic recovery.

3. A flexible hard rubber material which is the vulcanization product of a composition comprising a blend of rubber and sulphur in an amount sufficient to convert the rubber on cure to hard rubber with a normally elastic relatively non-plastic polymer of isobutylene, said polymer being of sufficiently high molecular weight to exhibit the property of substantially complete elastic recovery.

4. A flexible shock-resisting lining for tanks and the like which during use may be subjected to widely fluctuating temperature conditions, which lining is the vulcanization product of a mix comprising about 100 parts by weight of rubber, sulphur in an amount sufficient to convert the rubber on cure to hard rubber, and from about 100 to about 150 parts by weight of an elastic polymer of a purely aliphatic mono-olefine, said polymer being further characterized in having a relatively high elasticity over a wide range of temperatures and having elastic recovery to approximately its original length after elongation and release.

5. A composition comprising a vulcanized mixture of rubber and sulphur in an amount sufficient to convert the rubber on cure to hard rubber having admixed therewith at least 40 parts by weight of an elastic polymer of isbutylene per 100 parts by weight of rubber, said polymer having a molecular weight greater than 50,000.

6. A composition comprising rubber and sulphur in an amount sufficient to convert the rubber on cure to hard rubber having a vulcanization coefficient of at least about 30 blended with from about 100 to about 150 parts by weight of an elastic polymer of isobutylene having a molecular weight greater than 50,000.

7. An article composed at least in part of the vulcanization product of a composition as set forth in claim 1.

8. An article composed at least in part of a flexible hard rubber material as set forth in claim 2.

9. An article composed at least in part of a flexible hard rubber material as set forth in claim 3.

10. A structure comprising a wall having bonded thereto as a lining the vulcanization product set forth in claim 4.

11. A flexible ebonite type hard rubber composition comprising rubber vulcanized to the hard rubber state and an elastic polymer of isobutylene having a molecular weight greater than 50,000.

12. A flexible hard rubber material comprising rubber vulcanized to the hard rubber state and rendered flexible by incorporation with the rubber prior to cure to the hard rubber state of at least 40% by weight based on the rubber of an elastic high molecular weight polymer of a purely aliphatic mono-olefine having a branched carbon chain, said polymer being further characterized as having an elastic recovery to approximately its original length after elongation and release.

HENRY H. HARKINS.